(12) United States Patent
Bruns et al.

(10) Patent No.: US 9,975,422 B2
(45) Date of Patent: May 22, 2018

(54) FLUID CONTAINER FOR A MOTOR VEHICLE

(71) Applicant: Kautex Textron GmbH & Co. KG, Bonn (DE)

(72) Inventors: Andreas Bruns, Haren (DE); Stefan Janicke, Leer (DE); Hartmut Looden, Leer (DE); Mohr Olaf, Leer (DE); Alfred Sinning, Westoverledingen (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days. days.

(21) Appl. No.: 14/370,878

(22) PCT Filed: Dec. 1, 2012

(86) PCT No.: PCT/EP2012/004973
§ 371 (c)(1),
(2) Date: Jul. 7, 2014

(87) PCT Pub. No.: WO2013/102473
PCT Pub. Date: Jul. 11, 2013

(65) Prior Publication Data
US 2015/0144642 A1 May 28, 2015

(30) Foreign Application Priority Data

Jan. 5, 2012 (DE) .................. 10 2012 000 119

(51) Int. Cl.
*B60K 15/03* (2006.01)
*B62D 27/04* (2006.01)
(Continued)

(52) U.S. Cl.
CPC ............ *B60K 15/03* (2013.01); *B60K 15/067* (2013.01); *B60K 15/07* (2013.01); *B62D 27/04* (2013.01); *B62D 27/06* (2013.01); *B66F 9/07518* (2013.01)

(58) Field of Classification Search
CPC ...... B60K 15/067; B60K 15/07; B62D 27/06; B66F 9/07518
(Continued)

(56) References Cited

U.S. PATENT DOCUMENTS 192,310 A * 6/1877 Tippett .......................... 220/562
3,701,540 A * 10/1972 Pringle ......................... 280/834
(Continued)

FOREIGN PATENT DOCUMENTS

CN 2578143 Y 10/2003
DE 20208040 U1 8/2002
(Continued)

OTHER PUBLICATIONS

PCT Search Report and Written Opinion dated Feb. 27, 2013, received in corresponding PCT Application No. PCT/EP12/04973, 7 pgs.

*Primary Examiner* — Andrew T Kirsch
*Assistant Examiner* — Jennifer Castriotta
(74) *Attorney, Agent, or Firm* — Grossman, Tucker, Perreault & Pfleger, PLLC

(57) ABSTRACT

The invention concerns a fluid container (1) for a motor vehicle, in particular a fuel tank. The fluid container (1) comprises at least one clamping strap (3) surrounding this to hold it at predefined fixing points of the bodywork (4) of a motor vehicle. The fluid container (1) according to the invention is characterized in that the clamping strap (3) is premounted captively on the fluid container (1) without additional fixing means.

20 Claims, 2 Drawing Sheets

(51) Int. Cl.
*B60K 15/07* (2006.01)
*B62D 27/06* (2006.01)
*B60K 15/067* (2006.01)
*B66F 9/075* (2006.01)

(58) Field of Classification Search
USPC ....... 220/562, 751, 737, 694, 476, 480, 481; 206/806; 248/200, 500, 505, 510, 300
See application file for complete search history.

(56) References Cited

U.S. PATENT DOCUMENTS

| | | | | |
|---|---|---|---|---|
| 4,093,254 | A | * | 6/1978 | Ezaki ............................ 280/783 |
| 4,416,461 | A | * | 11/1983 | Hayashi et al. .............. 280/834 |
| 4,765,635 | A | * | 8/1988 | Okada .......................... 280/834 |
| 4,886,180 | A | * | 12/1989 | Bonczyk ....................... 220/646 |
| 2001/0020622 | A1 | | 9/2001 | Schmidt et al. |
| 2002/0030358 | A1 | * | 3/2002 | Palvoelgyi ................... 280/834 |
| 2011/0174856 | A1 | * | 7/2011 | Hayashi et al. .............. 224/538 |

FOREIGN PATENT DOCUMENTS

| | | |
|---|---|---|
| EP | 0373143 A1 | 6/1990 |
| FR | 2724877 A1 | 3/1996 |
| GB | 2430183 A | 3/2007 |
| WO | 2008003386 A1 | 1/2008 |

* cited by examiner

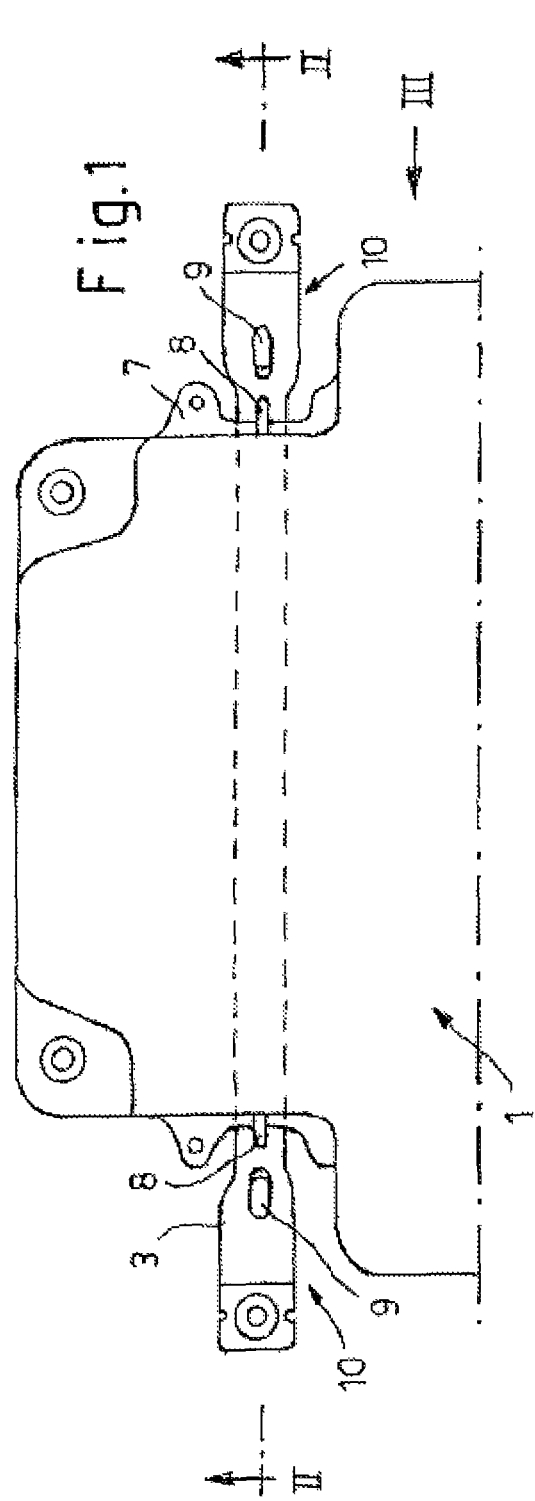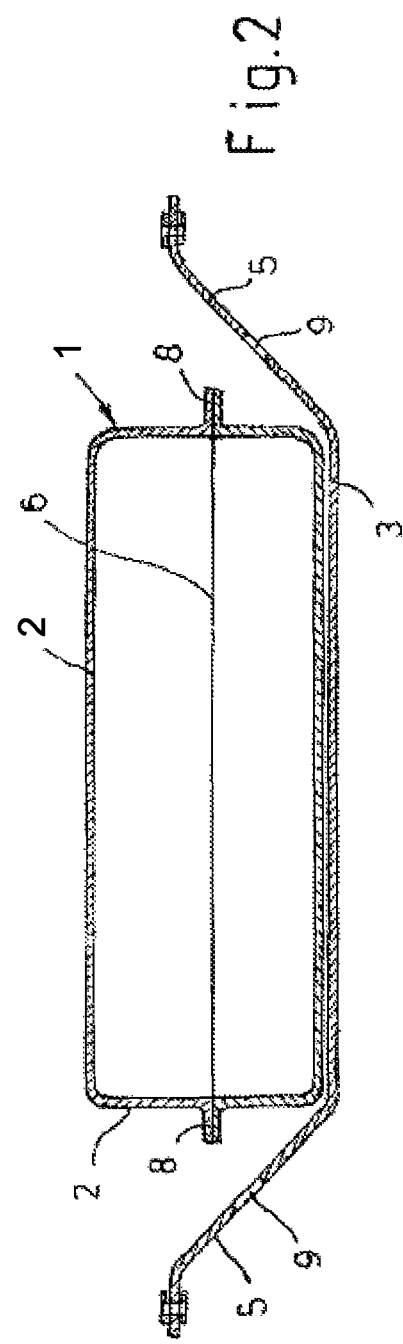

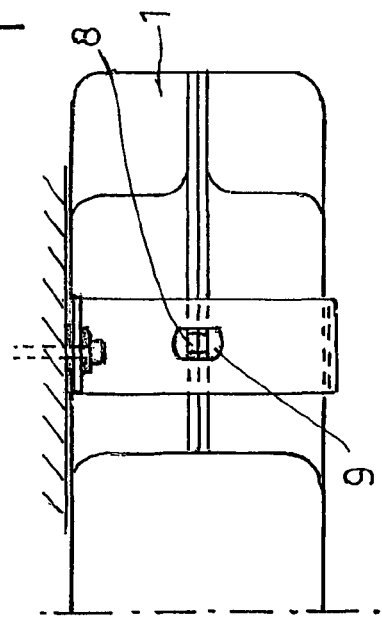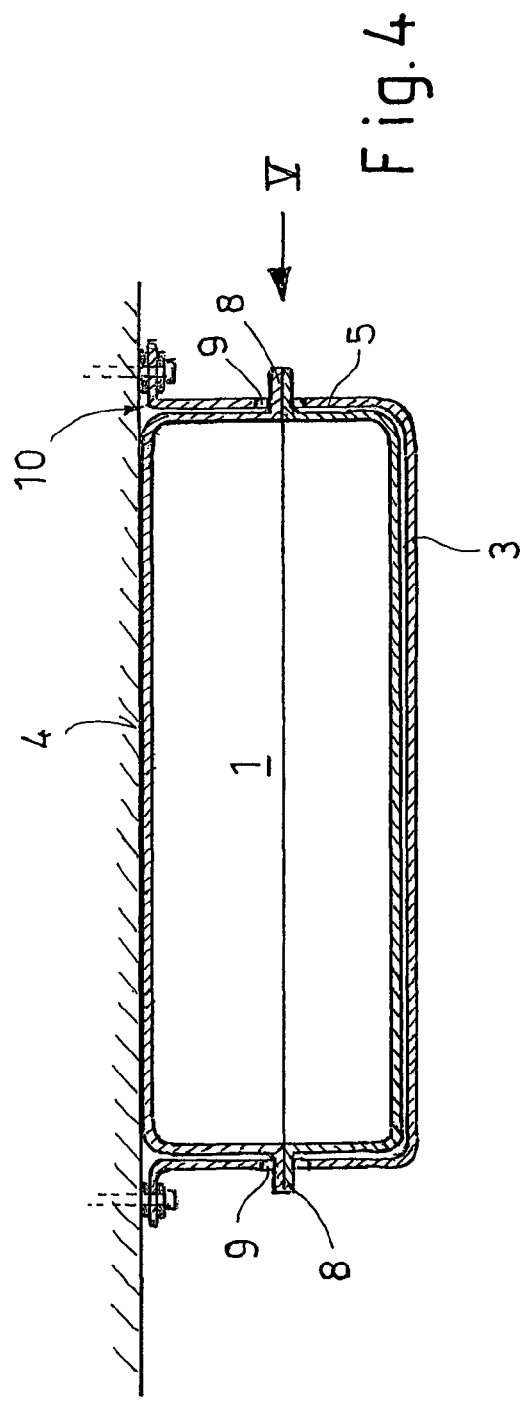

FLUID CONTAINER FOR A MOTOR VEHICLE

The invention concerns a fluid container for a motor vehicle, in particular a fuel tank, with at least one clamping strap at least partly surrounding the fluid container to hold the fluid container at predefined fixing points of the body of the motor vehicle.

Such a fluid container is known for example from European patent application EP 0 373 143 A1. The fluid container is attached to the underside of a motor vehicle by means of two clamping straps. In order to prevent a sagging or bulging of the container floor without substantial volume loss and with only slight material usage and fitting complexity, the container floor is provided with grooves open at the bottom and extending from clamping strap to clamping strap. In the grooves are inserted profile carriers which rest on the clamping straps. The profile carriers can be pressed into the grooves with slight elastic deformation of the groove flanks, so that together with the container they then form a manipulatable component. The clamping straps can be premounted on the profile carrier. This minimises the risk of sagging of the container filled with fluid, since the load resting on the container floor as a result of the fluid contained is supported by the carriers which in turn rest on the clamping straps.

This arrangement is admittedly useful in relation to the possible load relief on the container floor and in relation to the ground clearance of a vehicle equipped in this way, however the grooves extending in the floor of the fluid container reduce its interior volume.

In particular when the fluid container comprises one or more pump modules for delivery of the fluid to an assembly or a consumer in the vehicle, grooves in the container floor are not desirable since these constitute protrusions in the interior of the fluid container, in which regions no delivery module or delivery pump can be installed. A delivery pump or delivery module should be arranged as far as possible at the lowest point of the fluid container so that an unhindered supply of fluid is possible even when the vehicle is tilted or the fluid container is in an inclined position.

Apart from the stability aspects mentioned in EP 0 373 143 A1, it is desirable to premount clamping straps for fixing the fluid container to the motor vehicle immediately after production of the fluid container, so that the fluid container with the clamping straps arranged thereon can be handled more easily in the final assembly of the motor vehicle.

The invention is therefore based on the object of improving a fluid container of the type cited initially, in particular in regard to the ease of handling of the clamping straps surrounding this on installation. The fixing of the clamping straps in particular should not reduce the interior volume of the container.

This object is achieved by a fluid container with the features of Claim 1. Advantageous embodiments arise from the subclaims.

According to the invention a fluid container for a motor vehicle is provided, in particular a fuel tank, with at least one clamping strap extending below the fluid container and at least partly surrounding this to hold the fluid container at predefined fixing points of the body of the motor vehicle, wherein the fluid container according to the invention is characterised in that the clamping strap is premounted captively on the fluid container without additional fixing means.

Although reference is made below to a fuel tank as the fluid container, the invention should be understood to mean that the container can also be formed as a secondary fluid container, for example a secondary oil reservoir, a screen washer reservoir or a container for a liquid reducing agent (SCR container/selective catalytic reduction of exhaust gases).

Suitably the clamping strap is premounted so that for its fixing no indentations are required in the container contour, in particular no dome-like depressions or grooves in the container contour. As already mentioned above, such grooves or local stud-like depressions in the container contour lead to protrusions or ribs in the interior of the fluid container which are also in principle considered disruptive on the installation and fixing of fittings in the container interior and are therefore not desirable.

If the fluid container is made of one piece of plastic, for example by extrusion blow-moulding, such fittings can already be installed in the fluid container on its removal from the blow-moulding tool.

In a suitable and advantageous embodiment of the fluid container according to the invention, it is provided that the fluid container comprises protrusions which are moulded of one piece and engage in correspondingly formed openings in the clamping strap.

Preferably the fluid container is made of a thermoplastic material. It can be obtained by extrusion blow-moulding, deep drawing, rotational sintering or injection moulding.

If the fluid container according to the invention was obtained by injection moulding, the protrusions can be moulded on. If the fluid container is produced by extrusion blow-moulding, the protrusions can be produced in the blow-moulding tool. Alternatively the protrusions can be obtained by cutting or punching out material from a peripheral container flange. Finally it is possible to weld the protrusions onto the container subsequently.

A preferred variant of the fluid container according to the invention is characterised in that the clamping strap has a C-shaped or U-shaped, substantially form-stable contour adapted to the fluid container, with legs lying against this preferably at the side under pretension and partly surrounding this, wherein the legs are each provided with openings in which the protrusions engage.

The fluid container can comprise several clamping straps extending below and surrounding this in the installation position. These clamping straps are suitably tilted following and adapted to the contour of the fluid container and consist of a metal with a degree of resilience. Although above a C-shaped or U-shaped, substantially form-stable contour is described, the invention should however be understood such that the clamping straps can be angled repeatedly and/or rounded.

On premounting of the clamping straps or a clamping strap on the fluid container, the legs of the clamping straps are bent out sideways so that the container can be fitted into the contour of the clamping straps. In the final position, the legs of the clamping straps then spring back to their starting position, wherein the protrusions on the container engage in correspondingly formed openings of the clamping straps or a single clamping strap. Evidently it is possible to design the protrusions so that they lock in the openings of the clamping strap. This is however not usually necessary.

The clamping strap concerned can only be detached from the fluid container by bending out the legs of the clamping strap surrounding the container on the side. As the legs of the clamping strap are fixed, in the installation situation on the vehicle, by the fixing points provided at the ends, the security described above for premounting is sufficient to ensure that during transport of the fluid container, for example to an assembly line, the clamping strap remains captively on the fluid container.

Preferably the fluid container is formed as an extrusion blow-moulded plastic container and the protrusions are provided at diametrically opposing points of a peripheral container seam.

For example the protrusions can be formed as tabs or pegs in the container seam.

In a preferred variant of the fluid container according to the invention, the protrusions are formed in an at least partly peripheral flange or edge of the fluid container formed by the container seam and preferably extend in the plane defined by the flange or edge.

If the container is made by extrusion blow-moulding, the tabs or pegs can be formed in the container crimp seam i.e. in the separating plane of the tool on removal of the fluid container from the mould.

If the fluid container is produced for example from injection-moulded or deep-drawn shells, the protrusions can be formed in the region of the peripheral flange-like edge of the container shell.

The invention is explained below with reference to an embodiment example shown in the drawings:

These show:

FIG. 1 a top view of a fluid container according to the invention;

FIG. 2 a view along line II-II of FIG. 1;

FIG. 3 a side view in the direction of arrow III in FIG. 1;

FIG. 4 a section view through the fluid container in the installation position, and FIG. 5 a side view of the container in the installation position corresponding to the view in FIG. 3.

The fluid container 1 shown in the figures is formed as a fuel tank of thermoplastic material for a motor vehicle. This is an extrusion blow-moulded plastic container, the container wall of which consists of a multilayer extrudate (co-extrudate) of thermoplastic HDPE-based materials with barrier layers for hydrocarbons.

The fluid container 1 formed as a fuel tank is attached to the bodywork 4 of a motor vehicle by means of one or more clamping straps 3 of metal.

The drawings show only one clamping strap 3, but the invention should be understood such that the number of clamping straps 3 is not critical to the invention.

The clamping strap 3 is a metal strap formed approximately U-shaped in cross section and adapted to the contour of the fluid container 1, which strap is substantially inherently stable and the legs 5 of which are formed spring-flexible.

The contour of the clamping strap 3 can vary and is substantially adapted to the contour of the fluid container 1. The clamping strap 3 extends below the fluid container 1 in the installation position as shown in FIG. 4 and surrounds this at the side.

The fluid container 1 is provided with a peripheral container seam 6 which, when the fluid container 1 is formed as an extrusion blow-moulded container, runs in the separating plane of the blow-moulding tool.

When the fluid container 1 according to the invention is formed as an injection-moulded plastic container, this consists for example of two shells joined together at a peripheral edge, which in this case would form the container seam 6.

In the region of the container seam 6 the fluid container 1 has a flange-like edge 7 which extends only over part of the periphery of the fluid container 1. In the flange-like edge 7 are provided protrusions 8 on diametrically opposing sides of the fluid container 1 and extending in the plane of the flange-like edge 7, which protrusions can be formed as tabs or pegs. These protrusions 8 serve to hold the clamping strap 3 in its premounted position. In the clamping strap 3 at a corresponding point in each of the vertically extending legs 5 are provided openings 9 in which the protrusions catch or engage when the clamping strap 3 is premounted.

After production of the fluid container 1, the clamping strap 3 adapted to the contour of the fluid container 1 is snapped onto this so that the legs 5 of the clamping strap 3 lie against the outside of the container wall 2 and the protrusions 8 penetrate through the openings 9. For this it is necessary to bend the legs 5 of the clamping strap 3 outwards against their inherent elasticity so that the fluid container 1 can be inserted in the contour of the clamping strap 3. Because of their elasticity, the legs 5 of the clamping strap 3 then spring back into the starting position so that the protrusions 8 engage in the openings 9. In this position the fluid container 1 with clamping strap arranged thereon can be transported without the clamping strap 3 being lost.

The fixing of the clamping strap 3 in the position described above on the fluid container 1 furthermore has the advantage that, in the installation position of the fluid container 1, a form-fit securing of the fluid container 1 is achieved which acts transverse to the direction of gravity on the fluid container 1, so that no additional grooves and/or ribs are required on the container wall 2 to secure the fluid container 1 or the clamping strap 3 against forces occurring because of driving dynamics.

The clamping strap 3 is fitted with fixing brackets 10 moulded of one piece via which the fixing to the bodywork 4 can take place by means of screw bolts or other fixing means.

LIST OF REFERENCE NUMERALS

1 Fluid container
2 Container wall
3 Clamping strap
4 Bodywork
5 Leg
6 Container seam
7 Flange-like edge
8 Protrusions
9 Openings
10 Fixing bracket

What is claimed is:

1. A fluid container for a motor vehicle, comprising:
the fluid container formed as a plastic container;
at least one clamping strap at least partly surrounding the fluid container to hold the fluid container at predefined fixing points of bodywork of the motor vehicle;
wherein the fluid container comprises a container wall defining a container volume and a plurality of protrusions;
wherein the fluid container is formed as a plastic container;
wherein the fluid container comprises a plurality of shells, each of the shells having a shell wall forming a portion of the container wall and a peripheral flange formed as a monolithic structure with the shell wall, wherein the shells are joined at a peripheral container seam located between the flanges and the protrusions are provided at different points of the peripheral container seam;
wherein each protrusion is formed by a portion of the peripheral flange of at least one of the shells; and
wherein the clamping strap is premounted captively on the fluid container without additional fixing means by each of the protrusions being engaged in a correspondingly formed opening of the clamping strap.

2. The fluid container according to claim 1, wherein the fluid container is formed of a thermoplastic material.

3. The fluid container according to claim 1, wherein the clamping strap forms a C-shaped or U-shaped, substantially form-stable contour adapted to the fluid container, with legs lying against the fluid container under pretension and partly surrounding the fluid container, wherein the legs are each provided with the openings in which the protrusions engage.

4. The fluid container according to claim 1, wherein each of the protrusions formed by the portion of the peripheral flange of at least one of the shells is formed as a tab or a peg.

5. The fluid container according to claim 1, wherein each of the protrusions extend in a plane of the peripheral flange formed thereby.

6. The fluid container according to claim 1, wherein the fluid container is a fuel tank.

7. The fluid container according to claim 1, wherein the clamping strap is formed of metal.

8. The fluid container according to claim 1, wherein the plurality of shells are two opposing half shells.

9. The fluid container according to claim 8, wherein each protrusion is formed by a portion of the peripheral flange of each of the half shells.

10. The fluid container according to claim 1 wherein the shell wall of each of the shells is formed of a multi-layer extrudate.

11. A fluid container for a motor vehicle, comprising:
the fluid container formed as a plastic container;
at least one clamping strap at least partly surrounding the fluid container to hold the fluid container at predefined fixing points of bodywork of the motor vehicle;
wherein the fluid container comprises a container wall defining a container volume and a plurality of protrusions;
wherein the fluid container is formed as a plastic container;
wherein the fluid container comprises a plurality of shells forming the container wall and joined at a peripheral container seam, and each protrusion is provided at a different point of the peripheral container seam;
wherein each protrusion is formed by a portion of a peripheral flange, wherein the peripheral flange forms a portion of the peripheral container seam and is formed by at least one of the shells; and
wherein the clamping strap is premounted captively on the fluid container without additional fixing means by each of the protrusions being engaged in a correspondingly formed opening of the clamping strap.

12. The fluid container according to claim 11, wherein the fluid container is formed of a thermoplastic material.

13. The fluid container according to claim 11, wherein the clamping strap forms a C-shaped or U-shaped, substantially form-stable contour adapted to the fluid container, with legs lying against the fluid container under pretension and partly surrounding the fluid container, wherein the legs are each provided with the openings in which the protrusions engage.

14. The fluid container according to claim 11, wherein each of the protrusions formed by the portion of the peripheral flange of at least one of the shells is formed as a tab or a peg.

15. The fluid container according to claim 11, wherein each of the protrusions extend in a plane of the peripheral flange formed thereby.

16. The fluid container according to claim 11, wherein the fluid container is a fuel tank.

17. The fluid container according to claim 11, wherein the clamping strap is formed of metal.

18. The fluid container according to claim 11, wherein the plurality of shells are two opposing half shells.

19. The fluid container according to claim 18, wherein each protrusion is formed by a portion of the peripheral flange of each of the half shells.

20. The fluid container according to claim 11 wherein the shell wall of each of the shells is formed of a multi-layer extrudate.

* * * * *